June 2, 1959   G. F. MONTGOMERY ET AL   2,889,519
CLAMP-TYPE CURRENT TRANSDUCER
Filed April 23, 1958   3 Sheets-Sheet 1

INVENTORS
Carroll Stansbury
George Franklin Montgomery
BY
ATTORNEY

INVENTORS
Carroll Stansbury
George Franklin Montgomery
BY Arthur Vinograd
ATTORNEY INVENTORS
Carroll Stansbury
George Franklin Montgomery

ATTORNEY

United States Patent Office 2,889,519
Patented June 2, 1959

2,889,519

CLAMP-TYPE CURRENT TRANSDUCER

George Franklin Montgomery, Washington, D.C., and Carroll Stansbury, Bethesda, Md., assignors to the United States of America as represented by the Secretary of Commerce Application April 23, 1958, Serial No. 730,505

3 Claims. (Cl. 324—127)

This invention relates to electrical measuring instruments and more particularly is concerned with a portable, battery-powered, transistorized, clamp-type microammeter providing rapid and convenient means for measuring small alternating currents.

It has been common practice for many years to use current transducers for measuring alternating current in the power-frequency range. For convenience such a transducer often comprises a transformer having a secondary winding on a split core that can be clamped around a conductor carrying the power frequency current to be measured.

The present invention provides a miniaturized clamp-type transformer probe and transistor circuit for measuring small currents at audio and radio frequencies. It consists of a small clamp-type magnetic probe and specific means for amplifying the probe output to operate an indicating meter. Such an instrument provides a current-measuring complement to the well-known vacuum tube voltmeter found in all experimental electronic laboratories.

One object of this invention is to provide an improved instrument for measuring small alternating currents.

Another object of this invention is to provide a microammeter for measuring current in the audio and radio frequency ranges.

A further object of this invention is to provide a magnetic probe clamp-type microammeter for measuring small radio frequency currents.

An additional object of this invention is to provide a convenient portable microammeter.

A still further object of this invention is to provide a transistorized microammeter probe circuit for measuring small audio and radio frequency currents.

Other uses and advantages of the invention will become apparent upon reference to the specification and drawings, in which Fig. 1 shows the probe and current-indicating instrument of the present invention;

Figure 1:
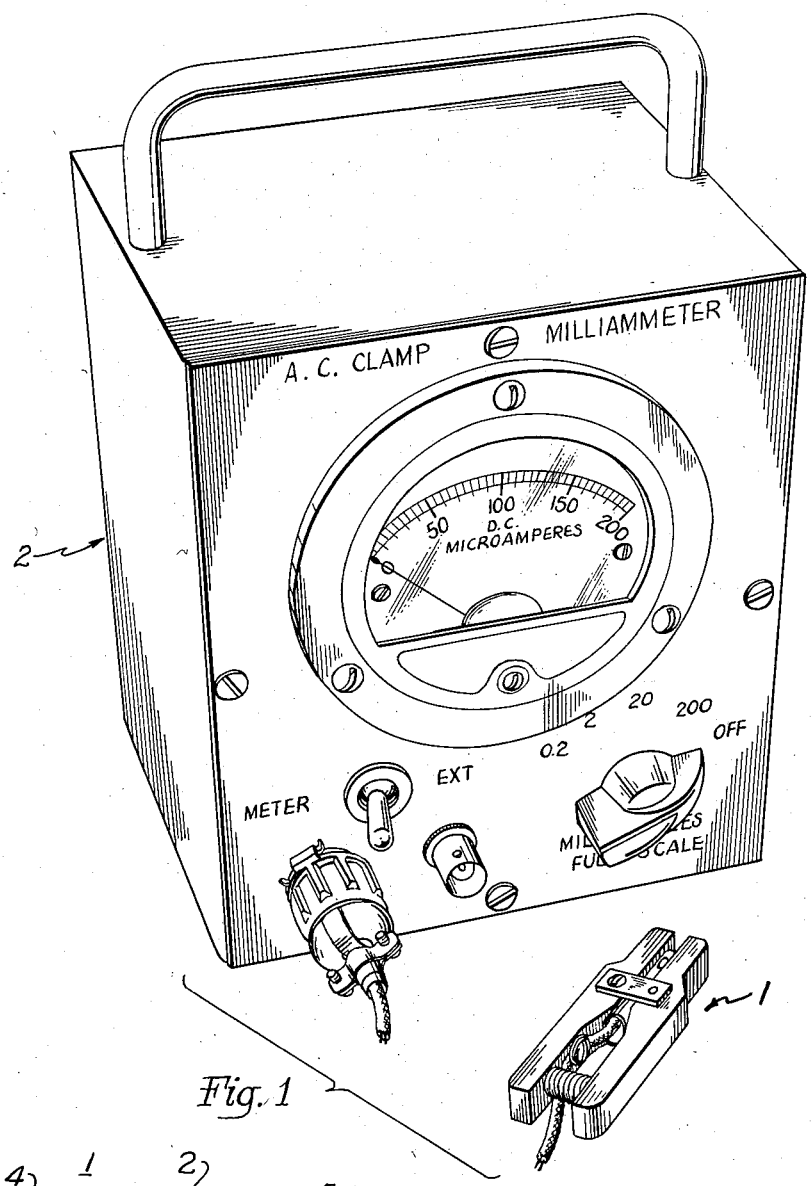

Referring to the drawings, in Fig. 1 is shown the improved microammeter of the present invention including a probe 1 and a housing 2, said housing enclosing amplifier circuitry and a current-measuring instrument as will be described.

Figure 2:
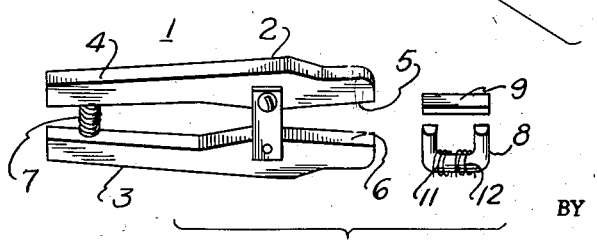
Fig. 2 is an enlarged exploded view of the probe shown in Fig. 1.

Fig. 2 shows an enlarged exploded view of the probe 1, shown in Fig. 1. As shown in Fig. 2, the probe 1 comprises a current pickup transducer in the form of a miniature split-core transformer 8—12 that can be clamped over a conductor making it unnecessary to open the circuit to make a measurement. The probe consists of a pair of handle elements 3 and 4 having facing jaw portions 5 and 6. Handles 3 and 4 at their outermost end are biased by a spring 7. The transformer core is adapted to fit in jaws 5 and 6 and consists of a plurality of 0.014-inch silicon-steel laminations, formed of matching C- and I-shaped sections 8 and 9, respectively. The I section closes the gap of the C section 8, when the core is assembled in the probe and the jaws 5 and 6 are closed. The completed core is 5/16-inch square, 1/8-inch thick, and contains a 1/8-inch square-shaped window as defined by the core elements. The legs of the C-shaped section 8 project upward from the lower jaw of the probe 1, while the I section 9 is contained in the upper jaw 5. A pin (not shown) passes through the center of the I section providing rotary movement in the plane of the jaws so that the I section 9 will seat itself properly in the projecting legs of the C section as the clamp closes. The matching faces of the respective sections 8 and 9 are accurately ground.

Two windings 11 and 12, each having 250 turns of No. 44 enameled wire are wound on the C-shaped section 8. One of these windings 11 may be considered a transformer secondary in respect to the circuit being measured and provides the actual measuring current. The other winding 12, the tertiary, forms part of a feedback network to provide frequency stabilization as will be described. By using such tertiary winding in the instrument of the present invention, the transformer output for a particular current can be made very nearly linear for the frequency range from 100 c.p.s. to 100 kc.

Figure 3:
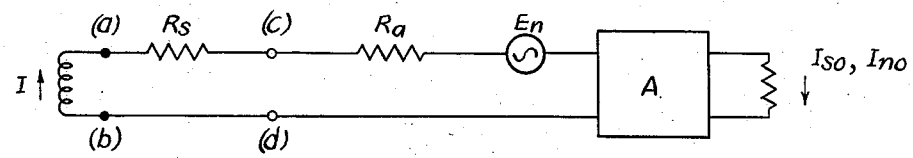
Fig. 3 is a generalized equivalent circuit for a probe and amplifier combination illustrating the principles of the present invention.

Fig. 3 shows a generalized equivalent circuit for the combination of a probe and alternating current amplifier. In the circuit shown in Fig. 3, the assumptions are made that the current to be measured (test current) is sinusoidal, has R.M.S. amplitude I amperes, and a frequency $f=\omega/2\pi$ cycles per second, and is carried by a conductor that passes through the window of a continuous magnetic core corresponding to the core described in connection with Figs. 1 and 2. An N-turn winding on the core will have a self-inductance of L henries and A.-C. resistance of $R_s$ ohms. In Fig. 3 the equivalent inductance and resistance of the winding is shown to the left of terminals designated as $c$ and $d$.

The quantity of interest is the voltage induced in the secondary winding by the test current I. This voltage can be obtained by assuming that the conductor carrying the test current and the winding form the primary and secondary windings of a transformer of turns ratio N. If terminals $a$ and $b$ in the diagram of Fig. 3 are short-circuited, the short-circuit current, neglecting secondary leakage reactance, is $$I/N = E/\omega L \quad (1)$$

where E, in volts, is the R.M.S. voltage induced by current I. The self-inductance, however is $$L = N^2 P \quad (2)$$

where P is the permeance of the core in webers per ampere-turn, so that $$E = \omega L I / N = \omega N P I \quad (3)$$

The quantity NP is the mutual inductance of the transformer.

The object in the present invention is to use the above-derived secondary output to actuate an indicating meter. If the current to be measured is small, the secondary output will necessarily require amplification. It is also evident that if the secondary load impedance is large compared with its self-reactance, the load current will be proportional to the induced voltage and, therefore, to frequency. The most useful instrument, however, is one in which the indication is independent of frequency. Both the required amplification and frequency independence are achieved in the following manner in accordance with the present invention.

In Fig. 3, terminals ($c$) and ($d$) represent the input terminals of an amplifier A having an input resistance $R_a$. $E_n$ designates a zero-impedance voltage generator that represents the internally developed amplifier noise. The amplifier input signal current is $$I_s = \frac{E}{\sqrt{R^2 + (\omega L)^2}} \quad (4)$$

where $R = R_s + R_a$. By substitution from Equation 1

$$I_s = \frac{I/N}{\sqrt{1 + (f_c/f)^2}} \quad (5)$$

where $f_c = R/2\pi L$. Now, let the current gain of the amplifier be $$A = A_0 \sqrt{1 + (f_c/f)^2} \quad (6)$$

in the range $f_1 \leq f \leq f_2$ and zero elsewhere. The amplifier signal output current will then be $$I_{s0} = AI_s = A_0 I/N \quad (7)$$

which is independent of frequency over the specified range.

The constitution of the internally developed noise in the amplifier can be represented by $$E_n^2 = \int_{f_1}^{f_2} e_n^2 df \quad (8)$$

It is certain that for any practical amplifier, $e_n^2$ will be a function of frequency. For those amplifiers that are close to ideal, however, $e_n^2$ will be nearly constant; it is assumed that $e_n^2$ is constant and defines an $R_n$ such that $$e_n^2 = 4kTR_n \text{ (volt}^2\text{-seconds)} \quad (9)$$

where $k$ is Boltzmann's constant ($1.38 \times 10^{-23}$ joules per degree Kelvin), and T is the temperature in degrees K. It is likewise certain that $R_s$ will vary with frequency, but to simplify matters it is assumed that $R_s$ can be represented adequately by an average value. With these assumptions, the differential input noise current is given by $$dI_n^2 = \frac{4kT(R_s + R_n)df}{R^2 + (\omega L)^2} \quad (10)$$

which, from the definition of $f_c$, becomes $$dI_n^2 = \frac{kT(R_s + R_n)df}{(\pi L)^2 [1 + (f_c/f)^2] f^2} \quad (11)$$

From Equation 6, the square of the amplifier noise output current will be $$I_{n0}^2 = \int_{f=f_1}^{f_2} A^2 dI_n^2 = \frac{A_0^2 kT(R_s + R_n)}{(\pi N^2 P)^2}(1/f_1 - 1/f_2) \quad (12)$$

Now, from Equations 7 and 12, the output signal-to-noise power ratio is $$S = I_{s0}^2 / I_{n0}^2 = \frac{(\pi NPI)^2 f_1 f_2}{kT(R_s + R_n)(f_2 - f_1)} \quad (13)$$

But for most practical instruments, $f_2 \gg f_1$, so that $$S = \frac{f_1(\pi NPI)^2}{kT(R_s + R_n)} \quad (14)$$

approximately. This is the basic design equation for the instrument: note that it is independent of $f_2$, the upper frequency limit of the band.

Equation 6 indicates that the amplifier gain varies with frequency. If equalization were provided by a network within the amplifier, both the calibration of the instrument and its frequency response would depend upon the permeance of the core; for a split core some means would then be necessary to insure that the core gap permeance were the same for each measurement.

Figure 4:
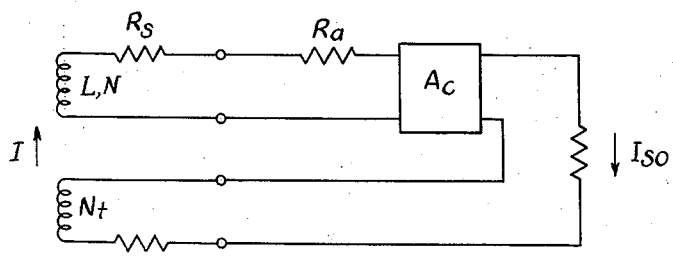
Fig. 4 is another generalized equivalent circuit of a probe and amplifier combination utilizing negative feedback.

To obviate such difficulties, the present invention employs an equalization system demonstrated by the equivalent circuit in Fig. 4. Negative current feedback from the output of the amplifier to the secondary winding itself may be employed. The feedback current will develop a counter E.M.F. across the secondary reactance that opposes the induced secondary voltage and is in turn proportional to the core permeance. This action is equivalent to loading the secondary with a low resistance; if the resistance is sufficiently small, it approximates a short circuit, and Equation 1 becomes applicable in fact. Since both the secondary induced voltage and the secondary reactance are proportional to permeance, the short-circuit current is independent of permeance and of physical change in the gap.

The path of the feedback current must not include the secondary resistance $R_s$, however, for the voltage drop across this resistance is in series with the input to the amplifier. To avoid this difficulty, feedback is applied to the tertiary winding 12 on the core (see Fig. 2). If we assume unity coupling between the secondary and tertiary windings, then, in Fig. 4

$$I_{s0} = A_c I_s = \frac{A_c[j\omega LI/N - j\omega LI_{s0}(N_t/N)]}{R + j\omega L}$$

$$= \frac{A_c(I - N_t I_{s0})}{N(1 - jf_c/f)} \quad (15)$$

where $A_c$ = (constant) is the amplifier current gain in the frequency range $f_1 \leq f \leq f_2$. Then $$I_{s0}(1 - jf_c/f + A_c N_t/N) = A_c I/N \quad (16)$$

and $$I_{s0} = \frac{I/N}{\sqrt{(1/A_c + N_t/N)^2 + (f_c/A_c f)^2}} \quad (17)$$

If $A_c N_t/N \gg 1$, then $$I_{s0} = \frac{I/N}{\sqrt{(N_t/N)^2 + (f_c/A_c f)^2}} \quad (18)$$

approximately. It is evident from comparison of 5 and 18 that feedback extends the range of constant response downward in frequency; the new cutoff frequency is $$f_c' = Nf_c/N_t A_t \quad (19)$$

It can be shown that for a given $f_c'$ and a given core, the necessary $A_c$ will be at least when $N_t = N$, approximately. It can therefore be assumed that $$f_c' = f_c/A_c \quad (20)$$

Figure 5:
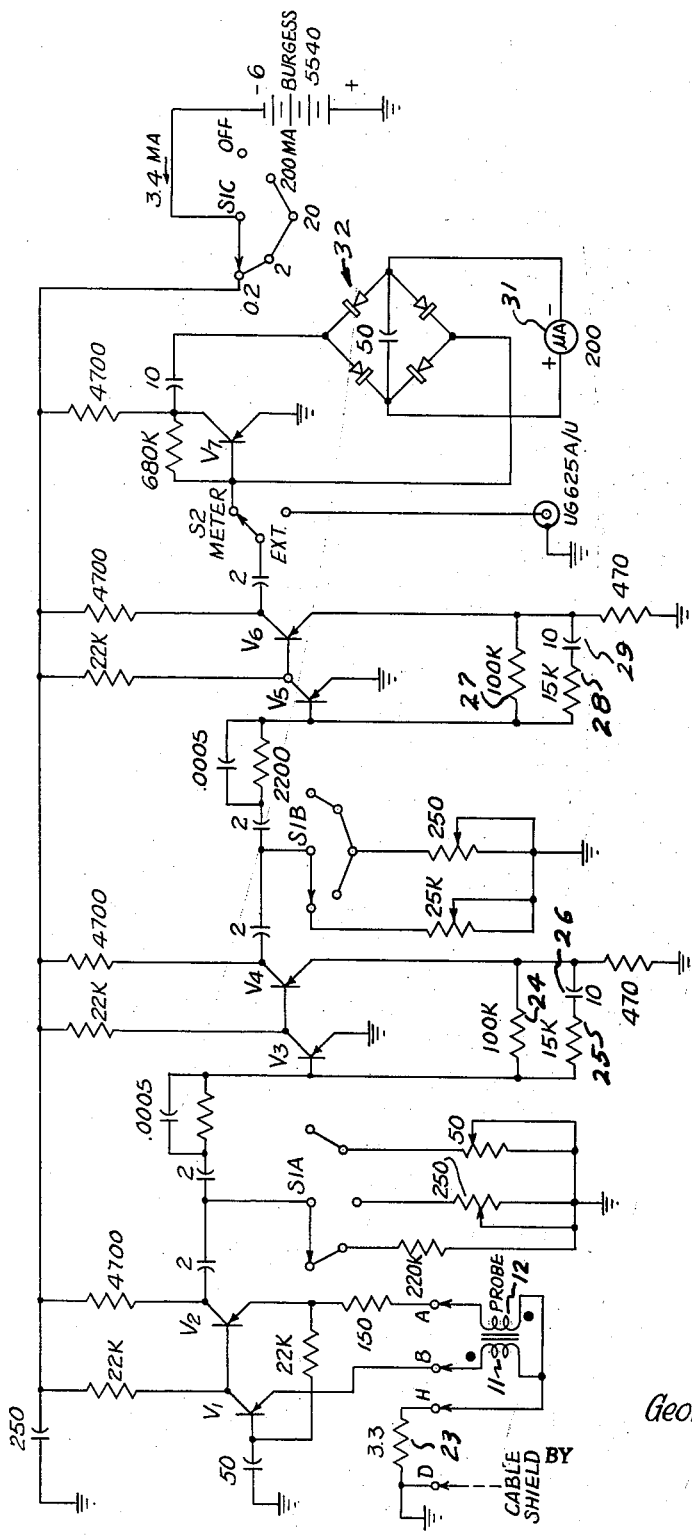
Fig. 5 is an over-all circuit diagram of the clamp-type microammeter of the present invention.

An over-all circuit diagram of the microammeter of the present invention is shown in Fig. 5. The probe described in connection with Figs. 1 and 2 respectively is represented in Fig. 5 by the secondary and tertiary windings 11 and 12 in Fig. 5. The secondary 11 supplies an input signal through terminal B to a preamplifier stage comprising transistors $V_1$ and $V_2$. The tertiary or feedback winding 12 is connected through terminal A in the emitter of transistor $V_2$. Since the amount of gain obtainable in preamplifiers $V_1$ and $V_2$ is substantially reduced by the large negative feedback by way of windings 11 and 12, positive current feedback is introduced into the negative loop by adding a 3.3-ohm resistor 23 at terminal H to recover some of the lost gain. The over-all gain in this stage is accordingly sacrificed to provide for frequency equalization and to reduce phase shift at the higher frequencies. The necessary over-all gain is provided by two intermediate stages of amplification, each using a pair of transistors. The first intermediate stage includes transistors $V_3$ and $V_4$, while the second intermediate stage is comprised of transistors $V_5$ and $V_6$. Each of the intermediate stages employs direct coupling between transistors. A feedback network from the emitter of transistor $V_4$ to the base of transistor $V_3$, comprising resistors 24 and 25 and capacitor 26 stabilizes the D.-C. operating point for this stage and reduces the overall current gain to a factor of about 20. Resistors 27 and 28 and capacitor 29 perform a like function in the intermediate stage including transistors $V_5$ and $V_6$.

The indicating means comprises a 200-microampere meter 31, driven through a full wave rectifier 32. Although the input current from the intermediate amplifying stages is more than adequate to drive the meter 31 to full scale, it is small compared to the normal operating characteristics of rectifier 32. The rectifier 32 therefore is operating in a nonlinear region. The nonlinearity of rectifier 32 is effectively avoided by employing a single transistor stage including transistor $V_7$ in which gain is sacrificed in order to provide negative feedback around transistor $V_7$ through the rectifier 32. Linearity of response of the entire microammeter instrument is within the 2-percent specification of the indicating meter 31 itself and shows that the degree of feedback provided around transistor $V_7$ is adequate.

Figure 6:
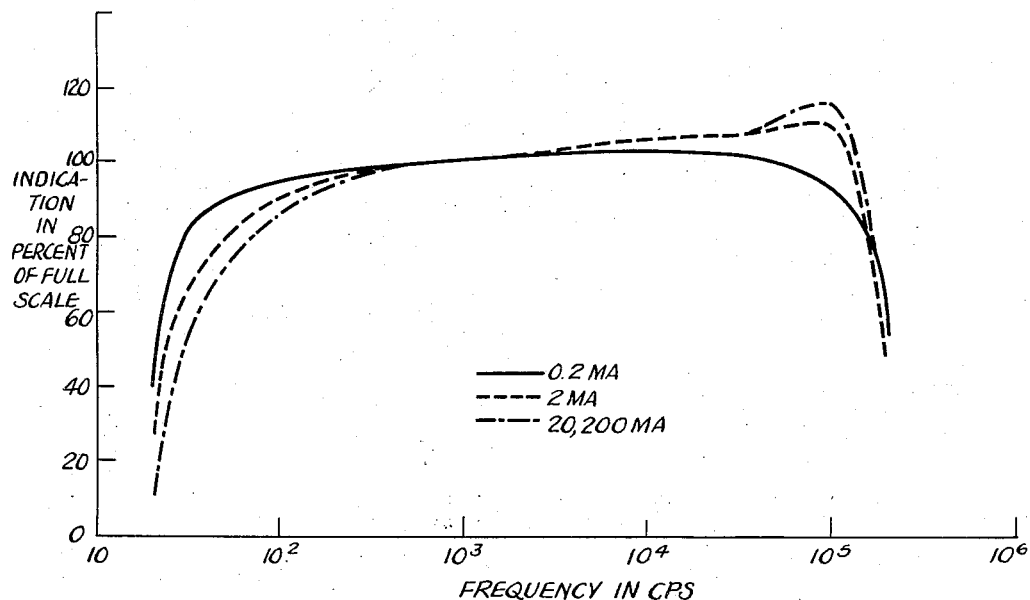
Fig. 6 shows a plurality of response curves for the microammeter of the present invention.

Response curves for the microammeter of the present invention are given in Fig. 6. Indication in percentage of full-scale reading is plotted as a function of frequency. The curves are plotted for four full-scale readings: 0.2 milliampere, 2 milliamperes, 20 milliamperes, and 200 milliamperes. The 20 and 200 milliampere curves are coincident.

The present invention provides an instrument using a clamp-type magnetic probe that can be employed to measure small alternating current in the audio and low radio frequency ranges. The instrument has the additional advantage of introducing a low impedance into the measured circuit without physically interrupting the circuit. The high frequency response limitation is imposed mainly by the limitation of the transistors and is in the order of 500 kilocycles.

It will be apparent that the embodiments shown are only exemplary and that various modifications can be made in construction and arrangement within the scope of the invention as defined in the appended claims.

What is claimed is:

1. In a sensitive current measuring instrument of the type employing a current measuring circuit and a clamp-type transducer for coupling the measuring circuit to a conductor carrying the current to be measured, said measuring circuit comprising a first amplifier, said transducer comprising a transformer having a split core including a movable section adapted to be clamped to said current carrying conductor, a first current measuring winding and a second feedback winding on said core, means connecting said first current measuring winding to the input of said first amplifier, means connecting a portion of the amplifier output to said feedback winding to provide negative current feedback to the transformer secondary, said first amplifier comprising a pair of cascaded transistors, said first current measuring winding being connected to the emitter of one of said transistors, said feedback winding being connected to the emitter of the other of said transistors and a resistor connecting said latter emitter to the base of said one transistor.

2. The invention of claim 1 including a grounded resistor of low ohmic value connected to said current measuring and feedback windings to provide positive current feedback.

3. A sensitive current measuring instrument of the type employing a current measuring circuit and a clamp-type transducer for coupling the measuring circuit to a conductor carrying current to be measured, said measuring circuit comprising first amplifier, said transducer comprising a transformer having a split core including a movable section adapted to be clamped to said current-carrying conductor, a first current-measuring winding and a second feedback winding on said core, means connecting said first current-measuring winding to the input of said first amplifier, means connecting a portion of the amplifier output to said feedback winding to provide negative current feedback to the transformer secondary, said first amplifier comprising a pair of cascaded transistors, said first current-measuring winding being connected to the emitter of one of said transistors, said feedback winding being connected to the emitter of the other of said transistors, a resistor connecting said latter emitter to the base of said one transistor, a grounded resistor of low ohmic value connected to said current-measuring and feedback windings to provide positive current feedback, an additional amplifier connected to the output of said first amplifier, said additional amplifier comprising a pair of cascaded transistors, a feedback network connecting the emitter of one transistor of said pair to the base of the other transistor of said pair, a current-indicating device, a rectifying network having output terminals connected to said indicating device, a transistor, the input terminals of said rectifying network being connected to the collector and base electrodes respectively of said transistor, and means coupling said transistor to the output of said additional transistor amplifier.

References Cited in the file of this patent

UNITED STATES PATENTS

| | | |
|---|---|---|
| 2,662,939 | Nowak | Dec. 15, 1953 |
| 2,763,831 | Uiga | Sept. 18, 1956 |